(12) United States Patent
Hata et al.

(10) Patent No.: US 7,644,186 B2
(45) Date of Patent: *Jan. 5, 2010

(54) METHOD AND APPARATUS FOR HEADER COMPRESSION

(75) Inventors: Koichi Hata, Katano (JP); Akihiro Miyazaki, Sakai (JP); Koji Imura, Machida (JP); Daiji Ido, Yokohama (JP)

(73) Assignee: Panasonic Corporation, Tokyo (JP)

( * ) Notice: Subject to any disclaimer, the term of this patent is extended or adjusted under 35 U.S.C. 154(b) by 1012 days.

This patent is subject to a terminal disclaimer.

(21) Appl. No.: 11/003,981

(22) Filed: Dec. 6, 2004

(65) Prior Publication Data
US 2005/0094647 A1 May 5, 2005

Related U.S. Application Data

(62) Division of application No. 09/929,344, filed on Aug. 15, 2001, now Pat. No. 6,889,261.

(30) Foreign Application Priority Data

Aug. 17, 2000 (JP) .............................. 2000-247329
Dec. 26, 2000 (JP) .............................. 2000-395185

(51) Int. Cl.
*G06F 15/16* (2006.01)
*H04J 3/24* (2006.01)

(52) U.S. Cl. ...................... 709/247; 709/241; 370/235; 370/392; 370/471; 370/474

(58) Field of Classification Search .................. 709/247, 709/241; 370/235, 392, 471, 474; 340/60
See application file for complete search history.

(56) References Cited

U.S. PATENT DOCUMENTS

| 6,300,887 B1 * | 10/2001 | Le ................................ 341/60 |
| 6,542,504 B1 * | 4/2003 | Mahler et al. ............... 370/392 |
| 6,577,596 B1 * | 6/2003 | Olsson et al. ............... 370/230 |
| 6,680,955 B1 * | 1/2004 | Le .............................. 370/477 |

OTHER PUBLICATIONS

H. Schulzrinne, S. Casner, R. Frederik, and V. Jacobson, "RTP: A Transport Protocol for Real-Time Applications", RFC 1889, Lawrence Berkeley National Laboratory, Jan. 1996.
C. Burmeister et al., "Robust Header Compression (ROHC) <draft-ietf-rohc-rtp-00.txt>", Jun. 29, 2000.

(Continued)

*Primary Examiner*—Hassan Phillips
*Assistant Examiner*—Saket K Daftuar
(74) *Attorney, Agent, or Firm*—Wenderoth, Lind & Ponack, L.L.P.

(57) ABSTRACT

A packet compressor 12 operates under a reliable mode or an optimistic mode. A mode determination unit 31 counts the number of ACK packets or NACK packets received by a unit time X by an ACK/NACK packet receiver 14. When the counted number of NACK packets is larger than a predetermined value Y, the mode determination unit 31 switches the operation mode of the packet compressor 12 to the reliable mode. When the counted number of ACK packets is larger than a predetermined value Z, the mode determination unit 31 switches the operation mode of the packet compressor 12 to the optimistic mode.

8 Claims, 11 Drawing Sheets

OTHER PUBLICATIONS

S. Casner and V. Jacobson, "Compressing IP/UDP/RTP Headers for Low-Speed Serial Links", RFC 2508, Cisco Systems, Feb. 1999.

V. Jacobson, "Compresing TCP/IP Headers for Low-Speed Serial Links", RFC 1144, Lawrence Berkeley National Laboratory, Feb. 1990.

"Robust Header Compression (ROHC)", Bormann C. et al., Internet Article, Jul. 14, 2000, XP002247470.

"[ROHC] Mode Transitions," Lloyd Wood, Internet Article, Jun. 5, 2000, retrieved from <http://www1.ietf.org/mail-archive/web/rohc/old-archive/msg00437.html> on Jan. 24, 2005, XP002314736.

* cited by examiner

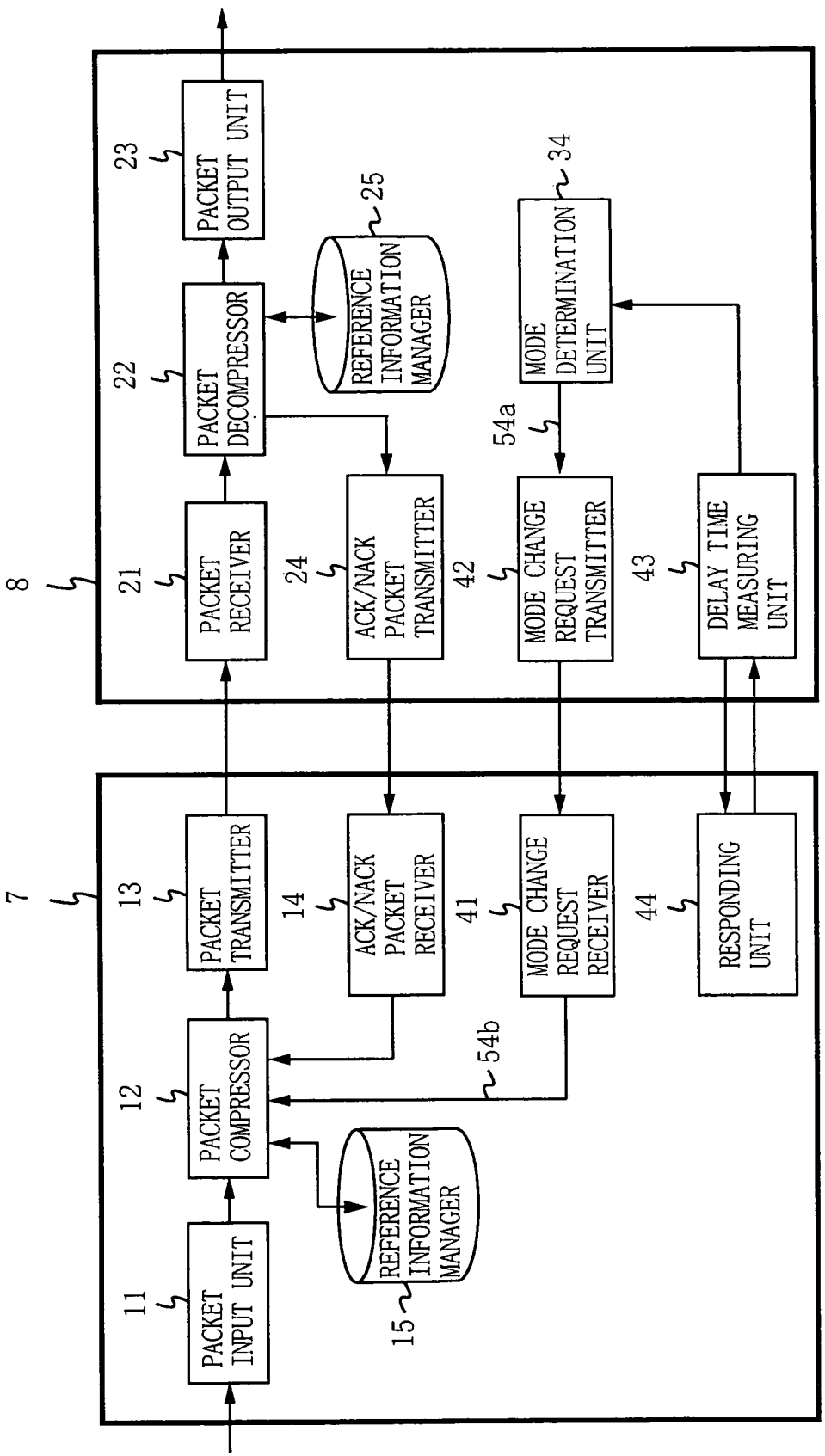

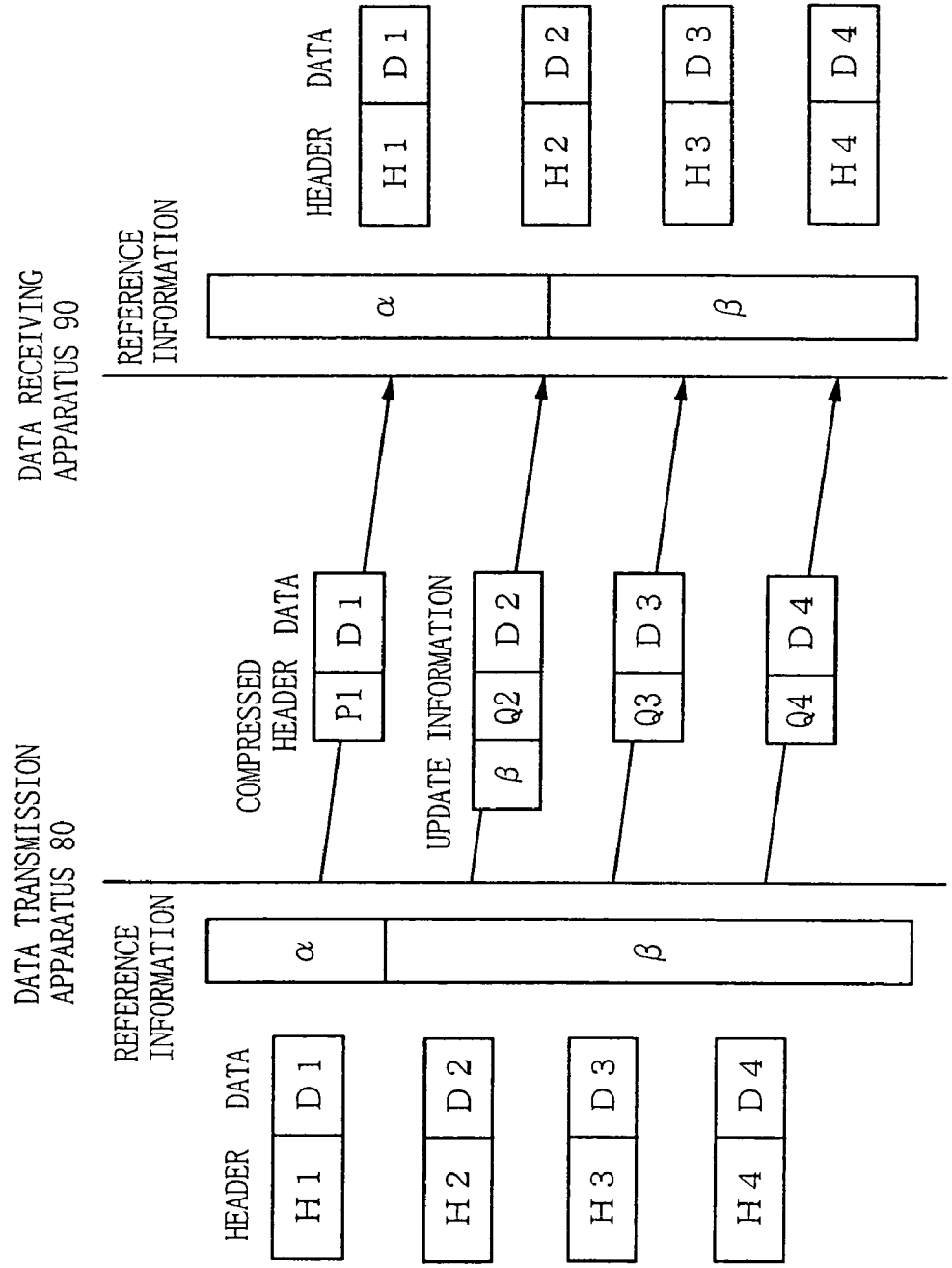

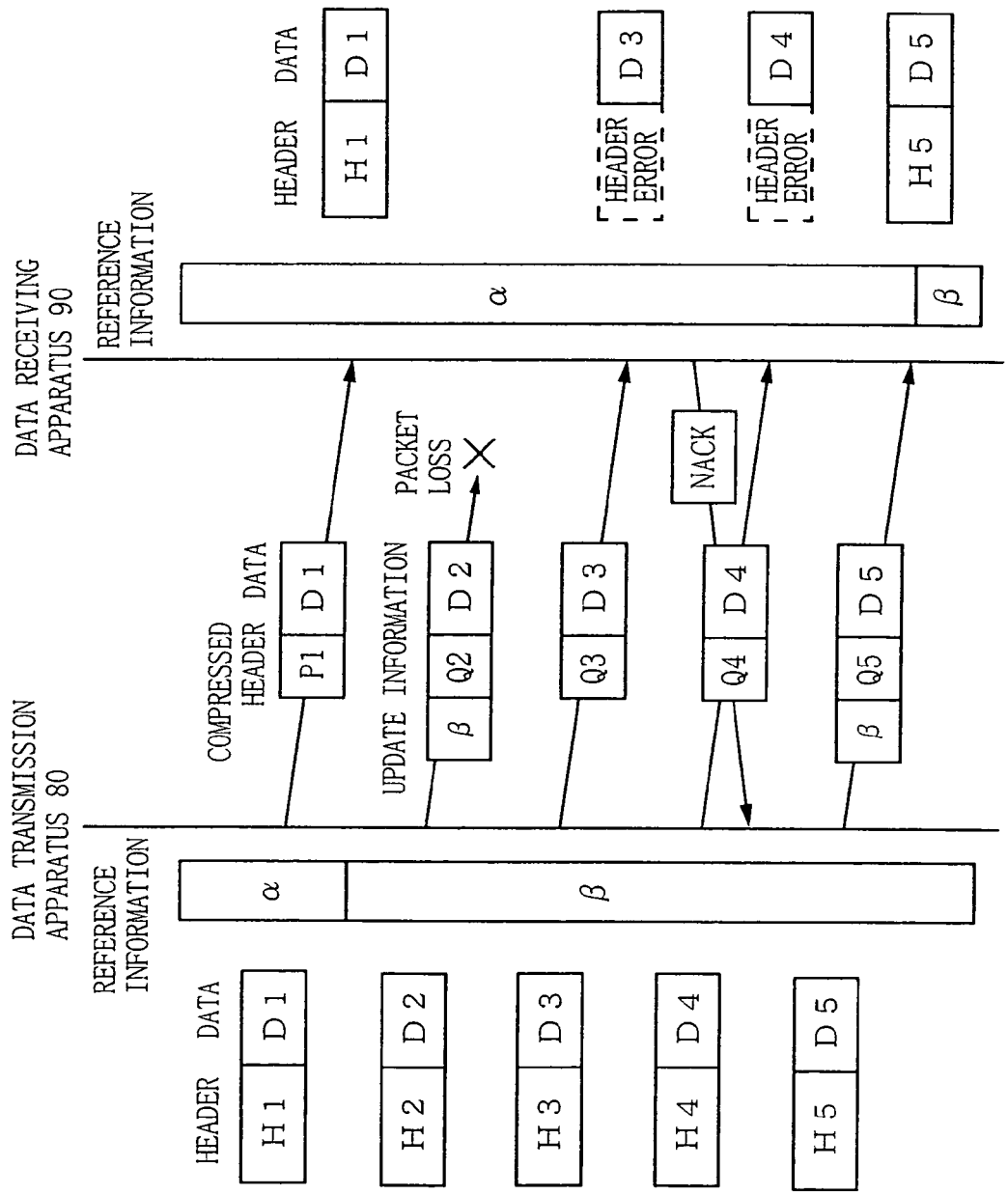

METHOD AND APPARATUS FOR HEADER COMPRESSION

This is a Divisional Application of U.S. application Ser. No. 09/929,344, filed Aug. 15, 2001 now U.S. Pat. No. 6,889,261.

BACKGROUND OF THE INVENTION

1. Field of the Invention

The present invention relates to methods and apparatuses for data compression and, more specifically, to a method and apparatus for header compression/decompression used in a data transmission system where a packet is compressed in a transmitting side and decompressed in a receiving side.

2. Description of the Background Art

Typical protocols recently known for data transmission over the Internet include TCP/IP (Transmission Control Protocol/Internet Protocol) and UDP/IP (User Datagram Protocol/Internet Protocol). One protocol known for real-time transmission of data such as audio and images under TCP/IP or UDP/IP is RTP (Realtime Transport Protocol), which is described in detail in "RTP: A Transport Protocol for Real-Time Applications", H. Schulzrinne, S. Casner, R. Frederik, and V. Jacobson, RFC1889, 1996.

When data is transmitted by unit of a packet in compliance with the protocols such as TCP/IP, the transmitting side adds a header to each packet. In data transmission over a low and midrange bit rate transmission path, however, the added header specified by TCP, UDP, IP, or other protocols increases the packet size, thereby disadvantageously causing overhead associated with communication. For example, to transmit 10-byte data under UDP/IP, the transmitting side has to add a 28-byte header to the original data, resultingly forming a 38-byte packet, which is approximately four times larger in size than the original data. If such increase happens quite often, the effective speed of the transmission path is substantially decreased.

In order to reduce communication overhead caused by the added header, a header compression scheme developed by V. Jacobson and defined in RFC1144 and RFC2508 has been known. In this scheme, among the fields of the header included in the packet, transmitted are only any field changed in value from the one included in the previous packet. Such field changed in value are not so many in the header, and therefore, in this scheme, header compression poses no special problem.

The Jacobson's header compression scheme is a standard for wired communication with a low transmission error rate, and is not suitable for wireless communication with a high transmission error rate. For example, consider a case where point-to-point communication is carried out under a protocol such as PPP (Point to Point Protocol) over a network shown in FIG. 6A or 6B between a gateway server 72 and a terminal 74 or a portable wireless terminal 77. As shown in FIG. 6A, when the gateway server 72 and the terminal 74 are connected to each other via a wired communication network 73 constructed by a modem, ISDN, or LAN, the Jacobson's header compression scheme works quite effectively. On the other hand, as shown in FIG. 6B, the gateway server 72 and the portable wireless terminal 77 are coupled to each other via a cellular phone network 75 by W-CDMA (Wideband Code Division Multiple Access), for example. Such network structure as shown in FIG. 6B has been widely adopted, with a recent increase in cellular phone users. In this network, however, transmission errors are prone to occur in a wireless transmission section 76, and therefore the Jacobson's header compression scheme does not effectively work.

One example of the header compression scheme for wireless communication where transmission errors frequently occur is known as ROHC (Robust Header Compression) studied by IETF (Internet Engineering Task Force). The detail of ROHC is described in "draft-ietf-rohc-rtp-00.txt 29 Jun. 2000".

FIG. 7 is a block diagram showing the structure of a data transmitting apparatus and a data receiving apparatus using ROHC. In FIG. 7, a data transmitting apparatus 80 compresses the header of each packet by referring to reference information stored in a reference information manager 85, and transmits the compressed packet. A data receiving apparatus 90 decompresses the header of each received packet by referring to reference information stored in a reference information manager 95.

Here, the reference information is information indicating how each field included in the header of the packet is changed from the one included in the header of the previous packet. For example, the header includes a UDP port number, an RTP sequence number, and an RTP timestamp. Assume herein that, compared with the header of the previous packet, the UDP port number is not changed, the RTP sequence number is increased by 1, and the RTP timestamp is increased by 50. In this case, the reference information indicates the states of the UDP port number, the RTP sequence number, and the RTP timestamp as assumed above.

FIGS. 8 to 11 are sequence charts of ROHC. In FIG. 8, the data transmitting apparatus 80 and the data receiving apparatus 90 both hold the same reference information $\alpha$. When transmitting a header H1 and data D1, the data transmitting apparatus 80 refers to the reference information $\alpha$ stored in the reference information manager 85 to find a compressed header P1 by the following equation (1), and transmits a packet composed of the compressed header P1 and the data D1.

$$P1 = H1 * \alpha \qquad (1)$$

where * represents an operation applied to the header and the reference information. The operation * varies for each field of the header.

On receiving the packet composed of the compressed header P1 and the data D1, the data receiving apparatus 90 refers to the reference information $\alpha$ stored in the reference information manager 95, and carries out an inverse operation of the operation represented by the above equation (1) to decompress the compressed header P1 to the header H1.

Similarly, the data transmitting apparatus 80 then transmits a packet composed of a compressed header Pi and data Di, and the data receiving apparatus 90 decompresses the compressed header Pi included in the received packet to the original header Hi.

Also in data transmission under ROHC, the manner of changes in the field included in the header may be varied during data transmission. For example, the RTP timestamp has been increased so far by 50, but by 100 at some point in time and thereafter. In this case, the data transmitting apparatus 80 and the data receiving apparatus 90 both have to correctly update the respective reference information.

The data transmitting apparatus 80 detects that the manner of changes in the field of the packet to be transmitted becomes varied and, based on the detection, updates the reference information stored in the reference information manager 85. In the above example, the data transmitting apparatus 80 updates the reference information $\alpha$ from "the RTP timestamp is increased by 50" to "the RTP timestamp is increased by 100". The updated reference information is hereinafter referred to as reference information β.

The data receiving apparatus 90 also has to update its own reference information to correctly decompress the header even after the data transmitting apparatus 80 updates its own reference information. Therefore, the data transmitting apparatus 80 transmits a packet together with information for updating the reference information at the receiving side (such information is hereinafter referred to as "update information"). With the received update information, the data receiving apparatus 90 updates the reference information stored in the reference information manager 95, and notifies the data transmitting apparatus 80 that the reference information has been correctly updated. The update information may be the updated reference information itself, or information indicating the difference between the reference information α and the reference information β.

In order for the data transmitting apparatus 80 to confirm that the reference information of the data receiving apparatus 90 has been correctly updated, two modes are known, that is, a "reliable mode" that ensures the reliability and an "optimistic mode", in consideration of compression efficiency. These modes are described in the above document ("draft-ietf-rohc-rtp-00.txt 29 Jun. 2000"). FIG. 9 is a sequence chart for the reliable mode. The data transmitting apparatus 80 operating in the reliable mode updates the reference information from α to β, and then transmits a packet with the update information added thereto until receiving a packet indicating that the reference information of the data receiving apparatus 90 has been correctly updated. Such packet is hereinafter referred to as "ACK packet". At this time, the data transmitting apparatus 80 refers to the updated reference information β to compress the header of the packet with the update information first added thereto and the headers of the packets coming thereafter. In FIG. 9, the updated reference information β is used as the update information Pi, represents a header compressed by referring to the reference information α, and Qi represents a header compressed by referring to the updated reference information β.

FIGS. 10 and 11 are sequence charts for the optimistic mode. The data transmitting apparatus 80 operating in the optimistic mode updates the reference information from α to β, and then adds the update information to only one packet for transmission. Thereafter, assuming that the reference information of the data receiving apparatus 90 has been correctly updated even without receiving the ACK packet, the data transmitting apparatus 80 transmits packets without the update information added thereto. At this time, the data transmitting apparatus 80 refers to the updated reference information β to compress the header of the packet with the update information added thereto and the headers of the packets coming thereafter. In this case, as shown in FIG. 10, if the data receiving apparatus 90 correctly receives the update information and updates the reference information from α to β by referring to the update information, no problem occurs in data transmission thereafter.

However, if failing to receive the update information as shown in FIG. 11, the data receiving apparatus 90 continues to decompress the header by referring to the original reference information α. The data receiving apparatus 90 carries out CRC (Cyclic Redundancy Check), for example, to detect any header decompression error. If detecting any header decompression error, the data receiving apparatus 90 transmits a packet for requesting transmission of the update information. Such packet is hereinafter referred to as "NACK packet". On receiving the NACK packet, the data transmitting apparatus 80 adds again the update information to one packet for transmission. Therefore, the data receiving apparatus 90 cannot correctly decompress the header from the time when failing to receive the packet with the update information added thereto to the time when receiving another packet with the update information added thereto.

Described below are the characteristics and drawbacks of the above described two modes for header compression, that is, the reliable mode and the optimistic mode.

In the reliable mode, the reference information is always correctly updated at the transmitting and receiving sides, thereby suppressing the occurrence of header decompression error at the receiving side. However, the transmitting side continues to transmit the packets with the update information added thereto until receiving the ACK packet, thereby degrading header compression efficiency and entire data transmission efficiency.

In the optimistic mode, the transmitting side adds the update information to only one packet for transmission and, even without receiving the ACK packet, compresses the headers of the packets coming thereafter by referring to the updated reference information. Therefore, if the data receiving apparatus 90 has correctly received the update information, high header compression efficiency can be achieved. However, if the data receiving apparatus 90 has not correctly received the update information due to transmission error, header decompression errors continuously occur until receiving the update information, thereby considerably degrading the data transmission efficiency.

To solve the above problem, the header compression scheme is switched between the reliable mode and the optimistic mode, thereby improving the header compression efficiency and the data transmission efficiency. However, how to switch the header compression scheme has been unclear so far.

SUMMARY OF THE INVENTION

Therefore, an object of the present invention is to present how to switch the header compression scheme between the reliable mode and the optimistic mode, and provide a method and apparatus for header compression/decompression for improving the header compression efficiency and the data transmission efficiency during wireless transmission.

The present invention has the following features to attain the object above.

A first aspect of the present invention is directed to a header compression apparatus for compressing a header of a packet to be transmitted by referring to reference information that is also included in a receiving side, and the apparatus includes: a reference information manager for storing and managing the reference information; a packet compressor for compressing the header of the packet in a specified operation mode by referring to the reference information, and selectively adding, to the compressed packet, update information for updating the reference information at the receiving side; a packet transmitter for transmitting the packet compressed by the packet compressor; a packet receiver for receiving an ACK packet indicating that the reference information at the receiving side has been correctly updated or a NACK packet for requesting transmission of the update information due to a header decompression error that occurred at the receiving side; and a mode determination unit for switching the operation mode of the packet compressor to a reliable mode where, after the reference information of the header compression apparatus is updated, the packet compressor continuously adds the update information until the ACK packet is received, and to an optimistic mode where the packet compressor adds the update information when the reference information of the header compression apparatus is updated and whenever receiving the NACK packet. When the operation mode is the optimistic mode and the number of NACK packets received by a unit time X is larger than a predetermined value Y, the mode determination unit switches the operation mode to the reliable mode, and when the operation mode is the reliable mode and the number of ACK packets received by the unit time X is larger than a predetermined value Z, the mode determination unit switches the operation mode to the optimistic mode.

According to the first aspect, the transmitting side determines the transmission quality based on the state of update of the reference information at the receiving side. When the transmission quality is degraded, the transmitting side switches the header compression scheme to the reliable mode. When the transmission quality is improved, the transmitting side switches the header compression scheme to the optimistic mode. As such, by switching the header compression scheme at the transmitting side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, the mode determination unit may calculate a rate of change in the number of NACK packets or ACK packets received by the unit time X, and increase the unit time X when the rate of change is smaller than a predetermined value A, and decrease the unit time X when the rate of change is larger than a predetermined value B.

Thus, when determining that the transmission quality is stable since NACK packets or ACK packets are received with roughly regular frequency, the transmitting side extends the time interval between possible changes of the header compression scheme and, otherwise, shortens the time internal. As such, highly responsive to the change in transmission quality during wireless transmission, the transmitting side switches the header compression scheme, thereby improving the compression efficiency and the transmission quality during wireless transmission. In other words, header decompression errors are suppressed for high compression efficiency, and therefore transmission cost can be reduced.

A second aspect of the present invention is directed to a header decompression apparatus for decompressing a header of a received packet by referring to reference information that is also included in a transmitting side, and the apparatus includes: a reference information manager for storing and managing the reference information; a packet receiver for receiving the packet with update information selectively added thereto for updating the reference information; a packet decompressor, provided with the packet received by the packet receiver, for updating the update information by using the update information and decompressing the header of the packet by referring to the reference information; a packet transmitter for transmitting an ACK packet indicating that the reference information has been correctly updated or a NACK packet for requesting transmission of the update information when a header decompression error occurs in the packet decompressor; mode determination unit for switching the operation mode of the transmitting side to a reliable mode where, after updating the reference information of the transmitting side, the transmitting side continuously adds the update information until receiving the ACK packet, and to an optimistic mode where the transmitting side adds the update information when the reference information of the transmitting side is updated and whenever receiving the NACK packet; and a mode notification unit for notifying the transmitting side of the operation mode selected by the mode determination unit. The mode determination unit counts the number of header decompression errors that occurred by a unit time X in the packet decompressor. When the operation mode is the optimistic mode and the number is larger than a predetermined value Y, the mode determination unit switches the operation mode to the reliable mode. When the operation mode is the reliable mode and the number is smaller than a predetermined value Z, the mode determination unit switches the operation mode to the optimistic mode.

According to the second aspect, the receiving side determines the transmission quality based on the state of occurrence of header decompression errors. When the transmission quality is degraded, the receiving side switches the header compression scheme at the transmitting side to the reliable mode. When the transmission quality is improved, the receiving side switches the header compression scheme to the optimistic mode. As such, by switching the header compression scheme at the receiving side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, the mode determination unit may calculate a rate of change in the number by the unit time X, and increase the unit time X when the rate of change is smaller than a predetermined value A, and decrease the unit time X when the rate of change is larger than a predetermined value B.

Thus, when determining that the transmission quality is stable since header decompression errors occur with roughly regular frequency, the receiving side extends the time interval between possible changes of the header compression scheme at the transmitting side and, otherwise, shortens the time internal. As such, highly responsive to the change in transmission quality during wireless transmission, the receiving side switches the header compression scheme of the transmitting side, thereby improving the compression efficiency and the transmission quality during wireless transmission. In other words, header decompression errors are suppressed for high compression efficiency, and therefore transmission cost can be reduced.

A third aspect of the present invention is directed to a header compression apparatus for compressing a header of a packet to be transmitted by referring to reference information that is also included in a receiving side, and the apparatus includes: a reference information manager for storing and managing the reference information; a packet compressor for compressing the header of the packet in a specified operation mode by referring to the reference information, and selectively adding, to the compressed packet, update information for updating the reference information at the receiving side; a packet transmitter for transmitting the packet compressed by the packet compressor; a packet receiver for receiving an ACK packet indicating that the reference information at the receiving side has been correctly updated or a NACK packet for requesting transmission of the update information due to a header decompression error that occurred at the receiving side; a delay time measuring unit for measuring a roundtrip delay time with respect to the receiving side by transmitting and receiving a packet to and from the receiving side; and a mode determination unit for switching the operation mode of the packet compressor to a reliable mode where, after the reference information of the header compression apparatus is updated, the packet compressor continuously adds the update information until the ACK packet is received, and to an optimistic mode where the packet compressor adds the update information when updating the reference information of the transmitting side and whenever receiving the NACK packet. The mode determination unit receives, by a unit time X, the roundtrip delay time from the delay time measuring unit, and switches the operation mode to the reliable mode when the operation mode is the optimistic mode and the roundtrip delay time is smaller than a predetermined value Y, and to the optimistic mode when the operation mode is the reliable mode and the roundtrip delay time is larger than a predetermined value Z.

According to the third aspect, based on the roundtrip delay time with respect to the receiving side, the transmitting side switches the header compression scheme to the reliable mode when the roundtrip delay time is short, and to the optimistic mode when long. As such, by switching the header compression scheme by the transmitting side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, the mode determination unit may calculate a rate of change in the roundtrip delay time, and increase the unit time X when the rate of change is smaller than a predetermined value A, and decrease the unit time X when the rate of change is larger than a predetermined value B.

Thus, when determining that the transmission quality is stable since the roundtrip delay time is roughly stable, the transmitting side extends the time interval between possible changes of the header compression scheme and, otherwise, shortens the time internal. As such, highly responsive to the change in transmission quality during wireless transmission, the transmitting side switches the header compression scheme, thereby improving the compression efficiency and the transmission quality during wireless transmission. In other words, header decompression errors are suppressed for high compression efficiency, and therefore transmission cost can be reduced.

A fourth aspect of the present invention is directed to a header decompression apparatus for decompressing a header of a received packet by referring to reference information that is also included in a transmitting side, and the apparatus includes: a reference information manager for storing and managing the reference information; a packet receiver for receiving the packet with update information selectively added thereto for updating the reference information; a packet decompressor for receiving the packet received by the packet receiver and updating the reference information by using the update information, and decompressing the header of the packet by referring to the reference information; a packet transmitter for transmitting an ACK packet indicating that the reference information has been correctly updated or a NACK packet for requesting transmission of the update information when a header decompression error occurs in the packet decompressor; a delay time measuring unit for measuring a roundtrip delay time with respect to the transmitting side by transmitting and receiving a packet to and from the transmitting side; a mode determination unit for switching the operation mode of the transmitting side to a reliable mode where, after updating the reference information of the transmitting side, the transmitting side continuously adds the update information until receiving the ACK packet, and to an optimistic mode where the transmitting side adds the update information when the reference information of the transmitting side is updated and whenever receiving the NACK packet; and a mode notification unit for notifying the transmitting side of the operation mode selected by the mode determination unit. The mode determination unit receives, by a unit time X, the roundtrip delay time from the delay time measuring unit, and switches the operation mode to the reliable mode when the operation mode is the optimistic mode and the roundtrip delay time is smaller than a predetermined value Y, and to the optimistic mode when the operation mode is the reliable mode and the roundtrip delay time is larger than a predetermined value Z.

According to the fourth aspect, based on the roundtrip delay time with respect to the transmitting side, the receiving side switches the header compression scheme to the reliable mode when the roundtrip delay time is short, and to the optimistic mode when long. As such, by switching the header compression scheme by the receiving side, the header compression efficiency and the transmission quality during wireless transmission can be improved In other words, it is possible to reduce time and cost required for transmission of a packet that cannot be decompressed, and also improve compression efficiency and greatly reduce cost required for packet transmission.

In this case, the mode determination unit may calculate a rate of change in the roundtrip delay time measured by the unit time X, and increase the unit time X when the rate of change is smaller than a predetermined value A, and decrease the unit time X when the rate of change is larger than a predetermined value B.

Thus, when determining that the transmission quality is stable since the roundtrip delay time is roughly stable, the receiving side extends the time interval between possible changes of the header compression scheme and, otherwise, shortens the time internal. As such, highly responsive to the change in transmission quality during wireless transmission, the receiving side switches the header compression scheme of the transmitting side, thereby improving the compression efficiency and the transmission quality during wireless transmission. In other words, header decompression errors are suppressed for high compression efficiency, and therefore transmission cost can be reduced.

A fifth aspect of the present invention is directed to a header compression method of compressing a header of a packet to be transmitted by referring to reference information that is also included in a receiving side, and the method includes: a packet compression step of compressing the header of the packet in a specified operation mode by referring to the reference information stored, and selectively adding, to the compressed packet, update information for updating the reference information at the receiving side; a packet transmission step of transmitting the packet compressed in the packet compression step; a packet receiving step of receiving an ACK packet indicating that the reference information at the receiving side has been correctly updated or a NACK packet for requesting transmission of the update information due to a header decompression error that occurred at the receiving side; and a mode determination step of switching the operation mode of the packet compression step to a reliable mode where, after the reference information is updated, the update information is continuously added until the ACK packet is received, and an optimistic mode where the update information is added when the reference information is updated and whenever the NACK packet is received. In the mode determination step, when the operation mode is the optimistic mode and the number of NACK packets received by a unit time X is larger than a predetermined value Y, the operation mode is switched to the reliable mode, and when the operation mode is the reliable mode and the number of ACK packets received by the unit time X is larger than a predetermined value Z, the operation mode is switched to the optimistic mode.

According to the fifth aspect, the transmitting side determines the transmission quality based on the state of update of the reference information at the receiving side. When the transmission quality is degraded, the transmitting side switches the header compression scheme to the reliable mode. When the transmission quality is improved, the transmitting side switches the header compression scheme to the optimistic mode. As such, by switching the header compression scheme at the transmitting side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, in the mode determination step, a rate of change in the number of NACK packets or ACK packets received by the unit time X is calculated, and the unit time X is increased when the rate of change is smaller than a predetermined value A, and decreased when the rate of change is larger than a predetermined value B.

Thus, when determining that the transmission quality is stable since NACK packets or ACK packets are received with roughly regular frequency, the transmitting side extends the time interval between possible changes of the header compression scheme and, otherwise, shortens the time internal. As such, highly responsive to the change in transmission quality during wireless transmission, the transmitting side switches the header compression scheme, thereby improving the compression efficiency and the transmission quality during wireless transmission. In other words, header decompression errors are suppressed for high compression efficiency, and therefore transmission cost can be reduced.

A sixth aspect of the present invention is directed to a header decompression method of decompressing a header of a received packet by referring to reference information that is also included in a transmitting side, and the method includes: a packet receiving step of receiving the packet with update information selectively added thereto for updating the reference information stored; a packet decompression step, provided with the packet received in the packet receiving step, of updating the update information by using the update information, and decompressing the header of the packet by referring to the reference information; a packet transmission step of transmitting an ACK packet indicating that the reference information has been correctly updated or a NACK packet for requesting transmission of the update information when a header decompression error occurs in the packet decompression step; a mode determination step of switching the operation mode of the transmitting side to a reliable mode where, after updating the reference information of the transmitting side, the transmitting side continuously adds the update information until receiving the ACK packet, and to an optimistic mode where the transmitting side adds the update information when the reference information of the transmitting side is updated and whenever receiving the NACK packet; and a mode notification step of notifying the transmitting side of the operation mode selected in the mode determination step. In the mode determination step, the number of header decompression errors that occurred by a unit time X in the packet decompression step is counted, and when the operation mode is the optimistic mode and the number is larger than a predetermined value Y, the operation mode is switched to the reliable mode, and when the operation mode is the reliable mode and the number is smaller than a predetermined value Z, the operation mode is switched to the optimistic mode.

According to the sixth aspect, the receiving side determines the transmission quality based on the state of occurrence of header decompression errors. When the transmission quality is degraded, the receiving side switches the header compression scheme at the transmitting side to the reliable mode. When the transmission quality is improved, the receiving side switches the header compression scheme to the optimistic mode. As such, by switching the header compression scheme at the receiving side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, in the mode determination step, a rate of change in the number by the unit time X is calculated, and the unit time X is increased when the rate of change is smaller than a predetermined value A, and decreased when the rate of change is larger than a predetermined value B.

Thus, when determining that the transmission quality is stable since header decompression errors occur with roughly regular frequency, the receiving side extends the time interval between possible changes of the header compression scheme at the transmitting side and, otherwise, shortens the time internal. As such, highly responsive to the change in transmission quality during wireless transmission, the receiving side switches the header compression scheme of the transmitting side, thereby improving the compression efficiency and the transmission quality during wireless transmission. In other words, header decompression errors are suppressed for high compression efficiency, and therefore transmission cost can be reduced.

A seventh aspect of the present invention is directed to a header compression method of compressing a header of a packet to be transmitted by referring to reference information that is also included in a receiving side, and the method includes: a packet compression step of compressing the header of the packet in a specified operation mode by referring to the reference information stored, and selectively adding, to the compressed packet, update information for updating the reference information at the receiving side; a packet transmission step of transmitting the packet compressed in the packet compression step; a packet receiving step of receiving an ACK packet indicating that the reference information at the receiving side has been correctly updated or a NACK packet for requesting transmission of the update information due to a header decompression error that occurred at the receiving side; a delay time measuring step of measuring a roundtrip delay time with respect to the receiving side by transmitting and receiving a packet to and from the receiving side; and a mode determination step of switching the operation mode of the packet compression step to a reliable mode where, after the reference information is updated, the update information is continuously added until the ACK packet is received, and an optimistic mode where the update information is added when the reference information to be referred to is updated and whenever the NACK packet is received. In the mode determination step, the roundtrip delay time measured by a unit time X in the delay time measuring step is provided, and when the operation mode is the optimistic mode and the roundtrip delay time is smaller than a predetermined value Y, the operation mode is switched to the reliable mode, and when the operation mode is the reliable mode and the roundtrip delay time is larger than a predetermined value Z, the operation mode is switched to the optimistic mode.

According to the seventh aspect, based on the roundtrip delay time with respect to the receiving side, the transmitting side switches the header compression scheme to the reliable mode when the roundtrip delay time is short, and to the optimistic mode when long. As such, by switching the header compression scheme by the transmitting side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, in the mode determination step, a rate of change in the roundtrip delay time measured by the unit time X is calculated, and the unit time X is increased when the rate of change is smaller than a predetermined value A, and decreased when the rate of change is larger than a predetermined value B.

Thus, when determining that the transmission quality is stable since the roundtrip delay time is roughly stable, the transmitting side extends the time interval between possible changes of the header compression scheme and, otherwise, shortens the time internal. As such, highly responsive to the change in transmission quality during wireless transmission, the transmitting side switches the header compression scheme, thereby improving the compression efficiency and the transmission quality during wireless transmission. In other words, header decompression errors are suppressed for high compression efficiency, and therefore transmission cost can be reduced.

An eighth aspect of the present invention is directed to a header decompression method of decompressing a header of a received packet by referring to reference information that is also included in a transmitting side, and the method includes: a packet receiving step of receiving the packet with update information selectively added thereto for updating the reference information stored; a packet decompression step, provided with the packet received in the packet receiving step, of updating the update information by using the update information, and decompressing the header of the packet by referring to the reference information; a packet transmission step of transmitting an ACK packet indicating that the reference information has been correctly updated or a NACK packet for requesting transmission of the update information when a header decompression error occurs in the packet decompression step; a delay time measuring step of measuring a roundtrip delay time with respect to the transmitting side by transmitting and receiving a packet to and from the transmitting side; a mode determination step of switching the operation mode of the transmitting side to a reliable mode where, after updating the reference information of the transmitting side, the transmitting side continuously adds the update information until receiving the ACK packet, and to an optimistic mode where the transmitting side adds the update information when the reference information of the transmitting side is updated and whenever receiving the NACK packet; and a mode notification step of notifying the transmitting side of the operation mode selected in the mode determination step. In the mode determination step, the roundtrip delay time measured by a unit time X in the delay time measuring step, and the operation mode is switched to the reliable mode when the operation mode is the optimistic mode and the roundtrip delay time is smaller than a predetermined value Y, and to the optimistic mode when the operation mode is the reliable mode and the roundtrip delay time is larger than a predetermined value Z.

According to the eighth aspect, based on the roundtrip delay time with respect to the transmitting side, the receiving side switches the header compression scheme to the reliable mode when the roundtrip delay time is short, and to the optimistic mode when long. As such, by switching the header compression scheme by the receiving side, the header compression efficiency and the transmission quality during wireless transmission can be improved. In other words, it is possible to reduce time and cost required for transmission of a packet that cannot be decompressed, and also improve compression efficiency and greatly reduce cost required for packet transmission.

In this case, in the mode determination step, a rate of change in the roundtrip delay time measured by the unit time X is calculated, and the unit time X is increased when the rate of change is smaller than a predetermined value A, and decreased when the rate of change is larger than a predetermined value B.

Thus, when determining that the transmission quality is stable since the roundtrip delay time is roughly stable, the receiving side extends the time interval between possible changes of the header compression scheme and, otherwise, shortens the time internal. As such, highly responsive to the change in transmission quality during wireless transmission, the receiving side switches the header compression scheme of the transmitting side, thereby improving the compression efficiency and the transmission quality during wireless transmission. In other words, header decompression errors are suppressed for high compression efficiency, and therefore transmission cost can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing the structure of a data transmitting apparatus and a data receiving apparatus according to a fourth embodiment of the present invention;

FIG. 10 is a normal sequence chart of an optimistic mode; and

FIG. 11 is an abnormal sequence chart of the optimistic mode.

DESCRIPTION OF THE PREFERRED EMBODIMENTS

Described below are a data transmitting apparatus and a data receiving apparatus according to each embodiment of the present invention. The object of the present invention is to improve compression efficiency and transmission quality during wireless transmission by dynamically switching a header compression scheme depending on the quality of a transmission path or the state of a roundtrip delay time. The data transmitting apparatus according to each embodiment of the present invention transmits each packet after compressing the header thereof. In this sense, the data transmitting apparatus can be regarded as a data compression apparatus or a header compression apparatus. Also, the data receiving apparatus according to each embodiment of the present invention decompresses the header of each received packet. In this sense, the data receiving apparatus can be regarded as a data decompression apparatus or a header decompression apparatus. Note that described below is a case of unidirectional communication from the data transmitting apparatus to the data receiving apparatus, but the description can also be applied to bi-directional communication carried out by two apparatuses each having transmission and receiving capabilities and each connected to a network.

First Embodiment

Figure 1:
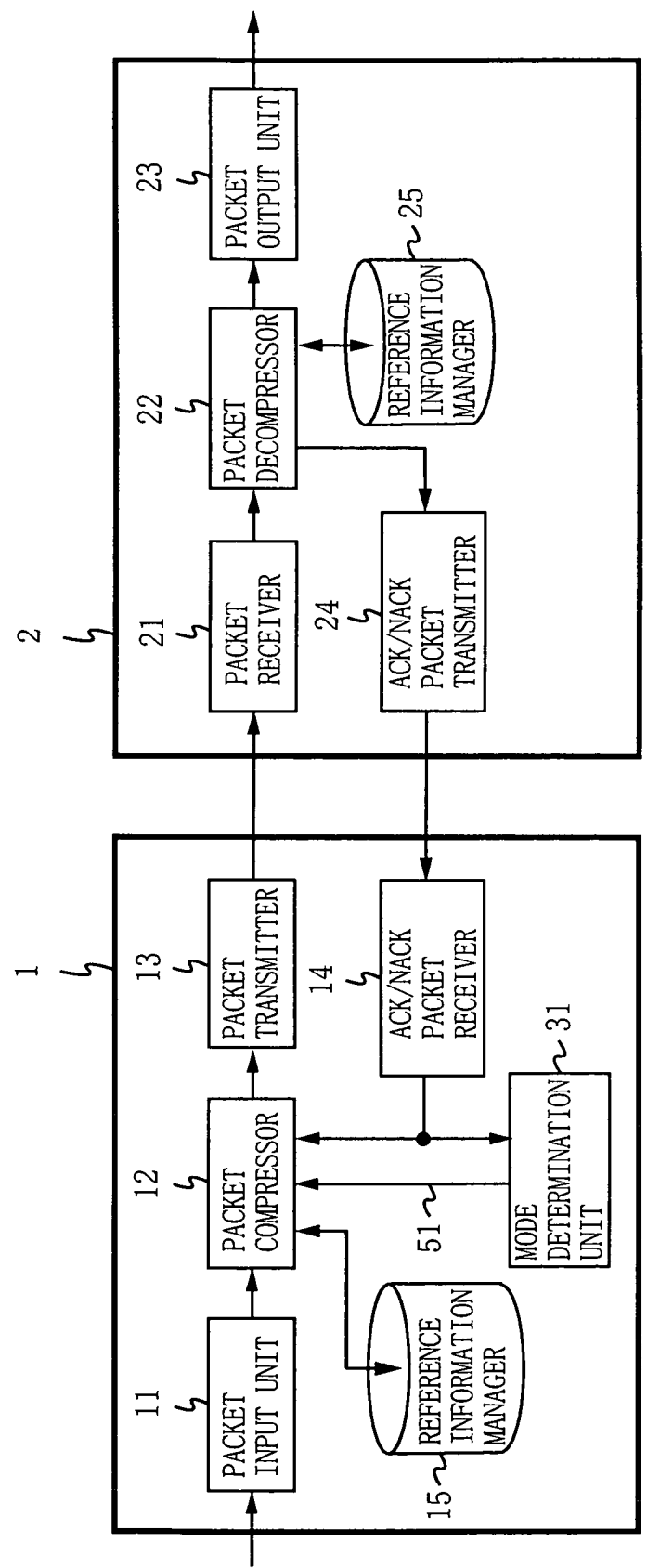
FIG. 1 is a block diagram showing the structure of a data transmitting apparatus and a data receiving apparatus according to a first embodiment of the present invention.

FIG. 1 is a data transmitting apparatus and a data receiving apparatus according to a first embodiment of the present invention. In FIG. 1, a data transmitting apparatus 1 includes a packet input unit 11, a packet compressor 12, a packet transmitter 13, an ACK/NACK packet receiver 14, a reference information manager 15, and a mode determination unit 31. A data receiving apparatus 2 includes a packet receiver 21, a packet decompressor 22, a packet output unit 23, an ACK/NACK packet transmitter 24, and a reference information manager 25.

The reference information manager 15 and the reference information manager 25 each store and manage the same reference information. Here, the reference information is information indicating a change in each field included in the header of the packet from the one included in the header of the previous packet. The reference information stored in the reference information manager 15 is referred to for compressing the header of the packet. The reference information stored in the reference information manager 25 is referred to for decompressing the header of the received packet.

The packet input unit 11 receives data by unit of a packet, and supplies it to the packet compressor 12. The packet compressor 12 refers to the reference information stored in the reference information manager 15 to compress the header of the supplied packet. The mode determination unit 31 outputs a mode switching signal 51. By this switching signal 51, the header compression scheme taken by the packet compressor 12 is switched to either one of the reliable mode or the optimistic mode as described in Background Art section. The packet transmitter 13 transmits the packet compressed by the packet compressor 12 to the data receiving apparatus 2.

When the reliable mode is taken, the packet compressor 12 updates the reference information stored in the reference information manager 15, and then adds update information to each packet until receiving a notification of receiving an ACK packet from the ACK/NACK packet receiver 14. Here, the ACK packet is a packet indicating that the reference information in the data receiving apparatus 2 has been correctly updated, and the update information is information for updating the reference information at the receiving side. Also, the packet compressor 12 refers to the updated reference information to compress the header of the packet with the update information added thereto and the packets coming thereafter.

When the optimistic mode is taken, the packet compressor 12 updates the reference information stored in the reference information manager 15, then adds the update information to only one packet and, thereafter, outputs packets without adding the update information thereto. Then, if receiving a notification of receiving a NACK packet from the ACK/NACK packet receiver 14, the packet compressor 12 adds the update information to the next packet. Here, the NACK packet is a packet for requesting transmission of the update information, the packet being transmitted when the data receiving apparatus 2 detects a header decompression error. The packet compressor 12 refers to the updated reference information to compress the header of the packet with the update information added thereto and the headers of the packets coming thereafter.

The packet compressor 12 takes an arbitrary scheme to know when the reference information should be updated. By way of example, the packet compressor 12 may analyze the packet to determine whether the reference information should be updated or not. Alternatively, update of the reference information may be specified when the packet is inputted to the packet input unit 11.

The packet receiver 21 receives the packet transmitted from the data transmitting apparatus 1, and supplies it to the packet decompressor 22. The packet decompressor 22 decompresses the header of the received packet by referring to the reference information stored in the reference information manager 25, and outputs the packet to the packet output unit 23. The packet output unit 23 outputs the packet including the decompressed header.

When receiving the packet with the update information added thereto, the packet decompressor 22 updates the reference information stored in the reference information manager 25, and notifies the ACK/NACK packet transmitter 24 of the update. After decompression, the packet decompressor 22 carries out CRC described in the above document ("draft-ietf-rohc-rtp-00.txt 29 Jun. 2000"), for example, to check whether or not the header has been correctly decompressed. When detecting any decompression error in the header, the packet decompressor 22 notifies the ACK/NACK packet transmitter 24 of the error.

The ACK/NACK packet transmitter 24 transmits, based on the notification from the packet decompressor 22, either one of the ACK packet indicating that the reference information has been correctly updated or the NACK packet requesting transmission of the update information, to the data transmitting apparatus 1.

The ACK/NACK packet receiver 14 receives the ACK packet or the NACK packet transmitted from the ACK/NACK packet receiver 14, and outputs the ACK or NACK packet to the packet compressor 12 and the mode determination unit 31.

The mode determination unit 31 determines, based on the ACK packet or the NACK packet received by the ACK/NACK packet receiver 14, which of the reliable mode and the optimistic mode should be taken in the packet compressor 12.

When the data transmitting apparatus 1 and the data receiving apparatus 2 are both in the optimistic mode, the mode determination unit 31 counts the number of NACK packets received by a unit time X by the ACK/NACK packet receiver 14. The number of NACK packets corresponds to the number of header decompression errors that occurred in the data receiving apparatus 2. When the number of NACK packets received by the unit time X is larger than a predetermined value Y, the mode determination unit 31 determines that the transmission quality is degraded, and outputs the mode switching signal 51 for instruction of switching to the reliable mode.

On the other hand, when the data transmitting apparatus 1 and the data receiving apparatus 2 are both in the reliable mode, the mode determination unit 31 counts the number of ACK packets received by the unit time X by the ACK/NACK packet receiver 14. The number of ACK packets corresponds to the number of reference information updates correctly carried out in the data receiving apparatus 2. When the number of ACK packets received by the unit time X is larger than a predetermined value Z, the mode determination unit 31 determines that the transmission quality is improved, and outputs the mode switching signal 51 for instruction of switching to the optimistic mode.

The packet compressor 12 switches the header compression scheme between the reliable mode and the optimistic mode based on the mode switching signal 51 outputted from the mode determination unit 31. For this switching, the packet compressor 12 carries out three-step handshake as described in detail below to confirm the switching of the header compression scheme in the packet decompressor 22, and then switches the header compression scheme to be taken by itself. In the first step of the three-step handshake, switching instruction information is transmitted from the data transmitting apparatus 1 to the data receiving apparatus 2. In the second step, a packet for confirming the switching of the header compression scheme is transmitted from the data receiving apparatus 2 to the data transmitting apparatus 1. In the third step, a packet compressed by the switched header compression scheme is transmitted from the data transmitting apparatus 1 to the data receiving apparatus 2.

Figure 2:
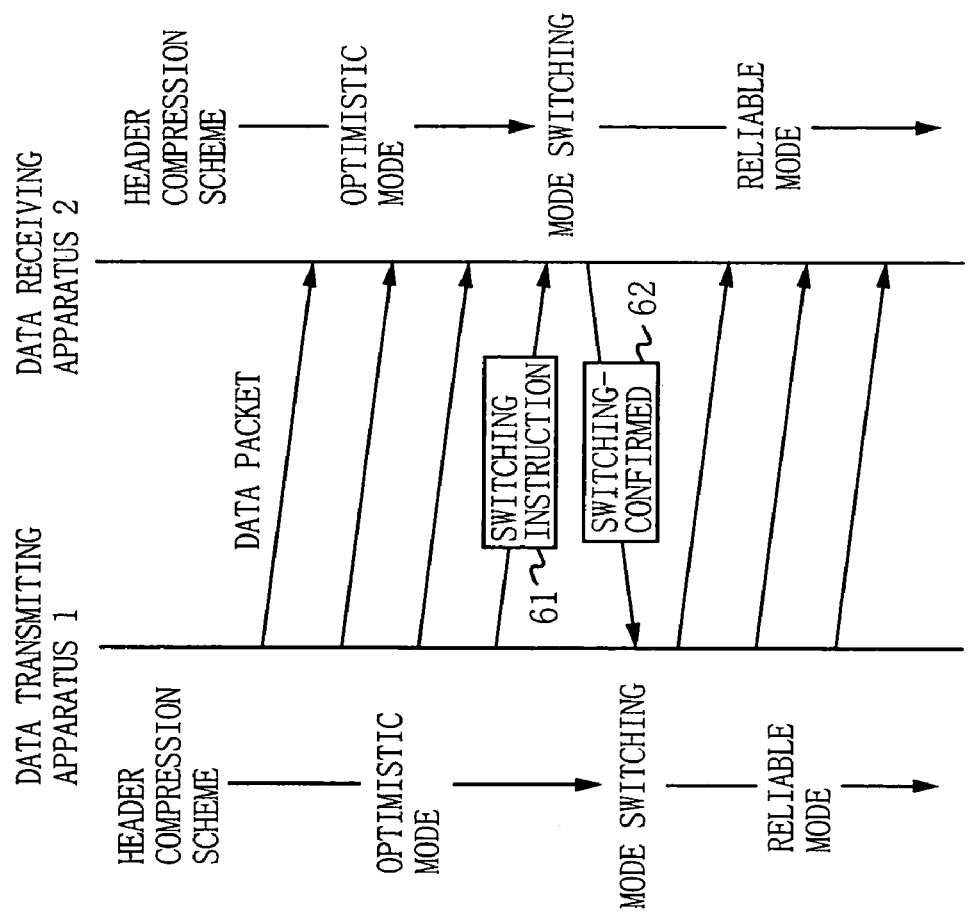
FIG. 2 is a diagram for demonstrating three-step handshake carried out when a header compression scheme is switched.

FIG. 2 is a diagram for exemplarily demonstrating the three-step handshake carried out for switching the header compression scheme. In this example, the header compression scheme is switched from the optimistic mode to the reliable mode, in both the data transmitting apparatus 1 and the data receiving apparatus 2. Before switching, each packet has been transmitted in the optimistic mode. When determining that the header compression scheme should be switched, the data transmitting apparatus 1 transmits a switching instruction information 61 for switching the header compression scheme. The data transmitting apparatus 1 may transmit this switching instruction information 61 by adding it to the packet containing data, or by using a control packet not containing any data. After transmitting the switching instruction information 61, the data transmitting apparatus 1 waits until receiving a switching-confirmed packet 62. On receiving the switching instruction information 61, the data receiving apparatus 2 switches its own header compression scheme, and also transmits the switching-confirmed packet 62 to the data transmitting apparatus 1. After receiving the switching-confirmed packet 62, the data transmitting apparatus 1 takes the switched header compression scheme, that is, operates in the reliable mode, for packet transmission.

The three-step handshake is described in detail in the above document ("draft-ietf-rohc-rtp-00.txt 29 Jun. 2000"). Alternatively, any other method may be taken for switching the header compression scheme in the data transmitting apparatus 1 and the data receiving apparatus 2.

As stated above, according to the present embodiment, the transmitting side determines the transmission quality based on the state of updating the reference information in the receiving side, and switches the header compression scheme to the reliable mode when the transmission quality is degraded and to the optimistic mode when improved. As such, by switching the header compression scheme in the transmitting side, header compression efficiency and transmission quality during wireless communication can be improved.

Example Modification of First Embodiment

In the first embodiment, the unit time X referred to by the mode determination unit 31 does not have any limitation. Therefore, the value of the unit time X may be dynamically varied depending on the number of ACK packets or NACK packets received.

The mode determination unit according to one example modification of the first embodiment counts the number of ACK packets or NACK packets received, and also divides the counted number by the number previously counted, thereby calculating the rate of change in the number of received packets. When the calculated rate of change is smaller than a predetermined value A, the mode determination unit determines that the transmission quality is stable, and increases the value of the unit time X. On the other hand, when the calculated rate of change is larger than a predetermined value B, the mode determination unit determines that the transmission quality is frequently varied, and decreases the value of the unit time X. Note that the rate of change in the number of packets is not restricted to the value calculated by division as described above, but may be a value calculated based on history of the number of received packets stored.

As such, in the present example modification, the transmitting side extends the time interval between possible changes in the header compression scheme when determining that the transmission quality is stable and, otherwise, shortens the time interval. As such, highly responsive to the change in transmission quality during wireless transmission, the transmitting side switches the header compression scheme, thereby improving the compression efficiency and the transmission quality during wireless transmission.

Second Embodiment

Figure 3:
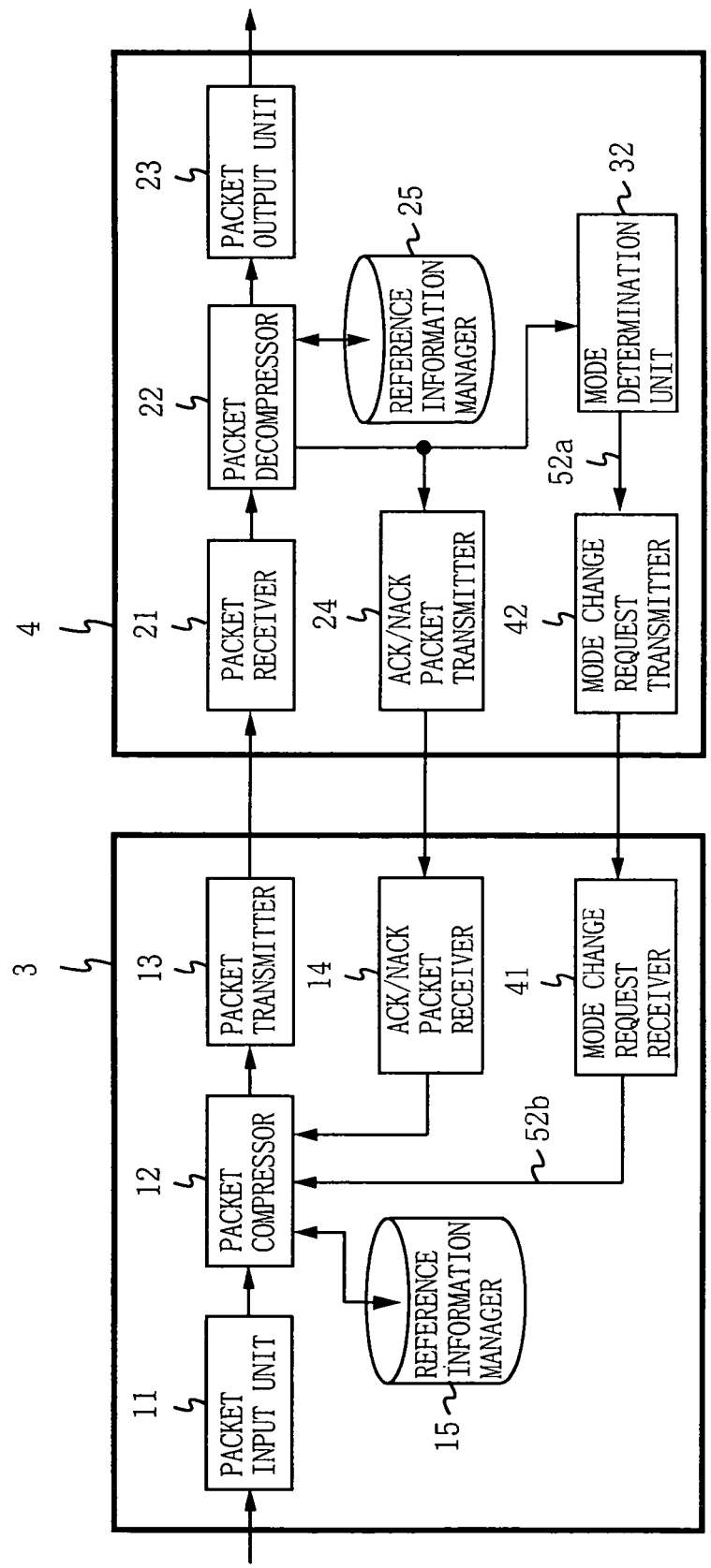
FIG. 3 is a block diagram showing the structure of a data transmitting apparatus and a data receiving apparatus according to a second embodiment of the present invention.

FIG. 3 is a block diagram showing the structure of a data transmitting apparatus and a data receiving apparatus according to a second embodiment of the present invention. In FIG. 3, a data transmitting apparatus 3 includes a mode change request receiver 41, and a data receiving apparatus 4 includes a mode determination unit 32 and a mode change request transmitter 42. In the second embodiment, the data receiving apparatus 4 determines the switching of the header compression scheme, which is different from the first embodiment where the data transmitting apparatus 1 determines the switching. In the second embodiment, components that are the same as those in the first embodiment are provided with the same reference numerals, and not described herein.

When detecting any header decompression error, the packet decompressor 22 also notifies the mode determination unit 32 of the error. The mode determination unit 32 counts the number of header decompression errors that occurred by the unit time X in the packet decompressor 22, and then operates as follows.

When the data transmitting apparatus 3 and the data receiving apparatus 4 are both in the optimistic mode, if the counted number of header decompression errors is larger than the predetermined value Y, the mode determination unit 32 determines that the transmission quality is degraded, and outputs a mode switching signal 52a for switching to the reliable mode.

On the other hand, the data transmitting apparatus 3 and the data receiving apparatus 4 are both in the reliable mode, if the counted number of header decompression errors is smaller than the predetermined value Z, the mode determination unit 32 determines that the transmission quality is improved, and outputs the mode switching signal 52a for switching to the optimistic mode.

When the mode determination unit 31 outputs the mode switching signal 52a, the mode change request transmitter 42 transmits a packet containing the information about the mode switching signal 52a. The mode change request receiver 41 receives the packet transmitted from the mode change request transmitter 42, and outputs a mode switching signal 52b having the same value as that of the mode switching signal 52a to the packet compressor 12.

The packet compressor 12 switches the header compression scheme based on the mode switching signal 52b outputted from the mode change request receiver 41. For this switching, as with the first embodiment, the three-step handshake is carried out, for example.

As stated above, according to the present embodiment, the receiving side determines the transmission quality based on the state of occurrence of header decompression errors. If determining that the transmission quality is degraded, the header compression scheme at the transmitting side is switched to the reliable mode and, if improved, to the optimistic mode. As such, the header compression scheme at the transmitting side is switched by the receiving side, thereby improving the header compression efficiency and the transmission quality during wireless communication.

Third Embodiment

Figure 4:
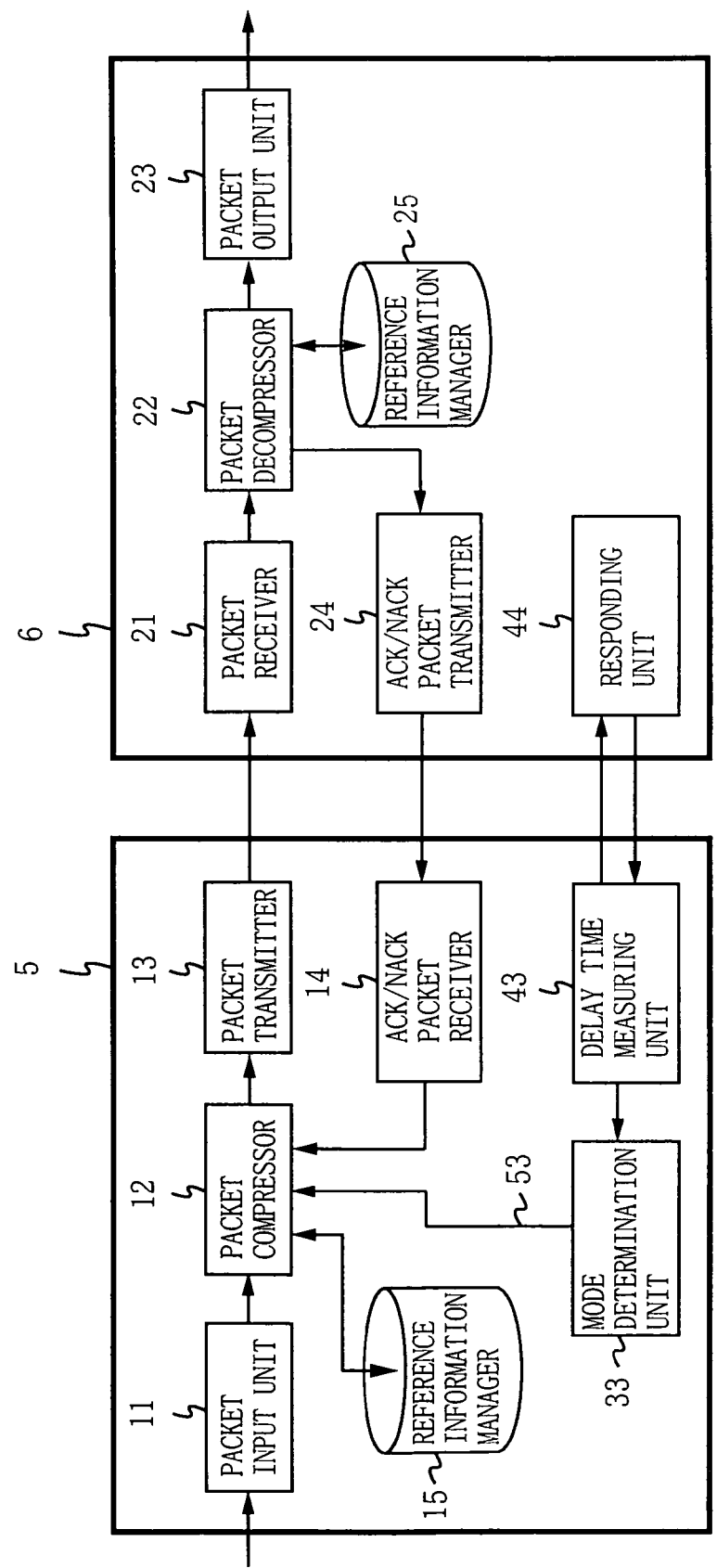
FIG. 4 is a block diagram showing the structure of a data transmitting apparatus and a data receiving apparatus according to a third embodiment of the present invention.
Figure 6A:
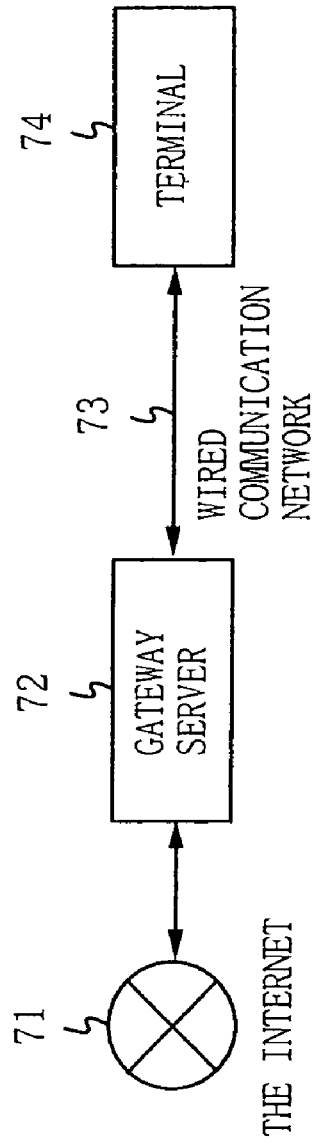
FIG. 6A is a diagram showing a communication network not including wireless communication.
Figure 6B:
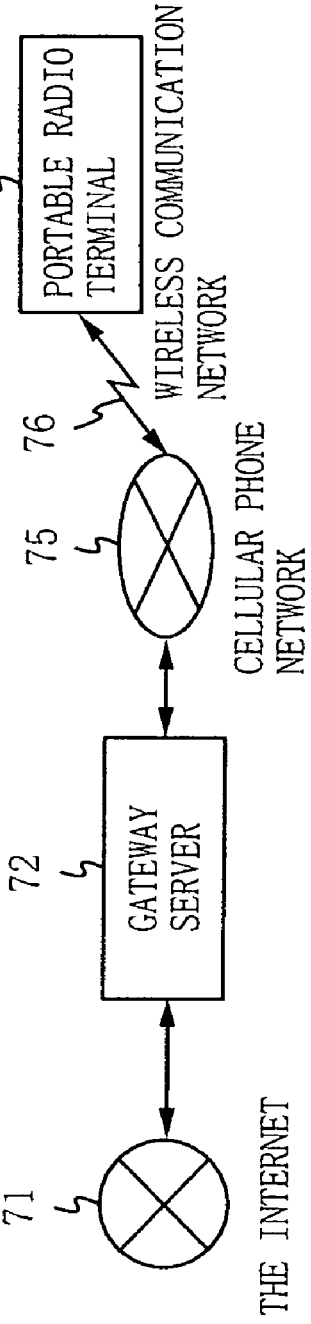
FIG. 6B is a diagram showing a communication network including wireless communication.
Figure 7:
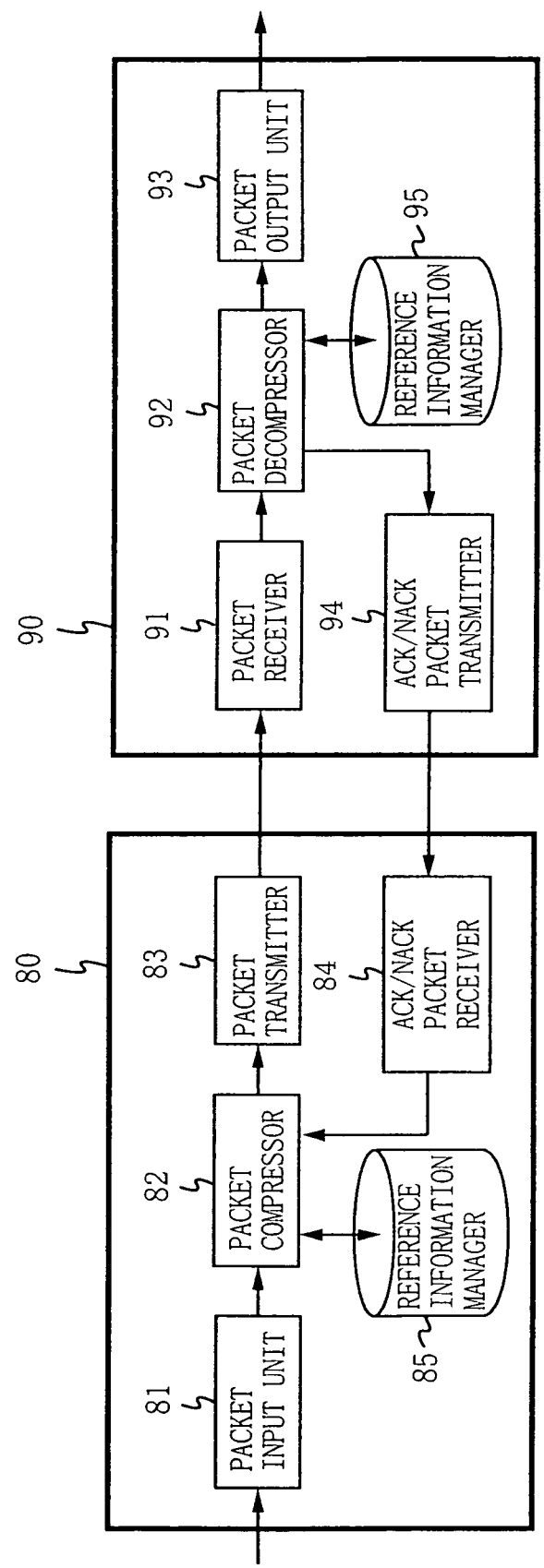
FIG. 7 is a block diagram showing the structure of a conventional data transmitting apparatus and a conventional data receiving apparatus using ROHC.
Figure 8:
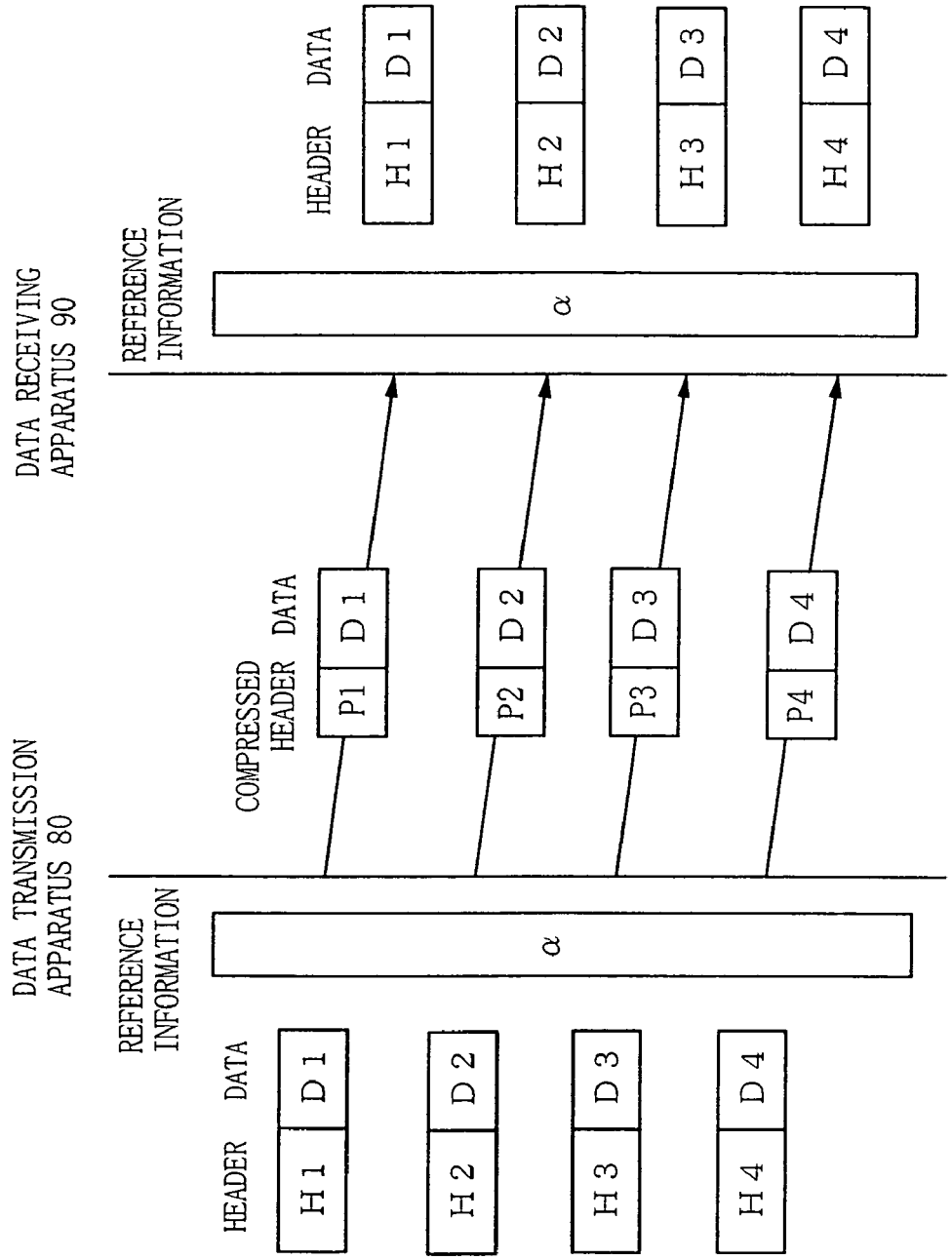
FIG. 8 is a sequence chart of ROHC.
Figure 9:
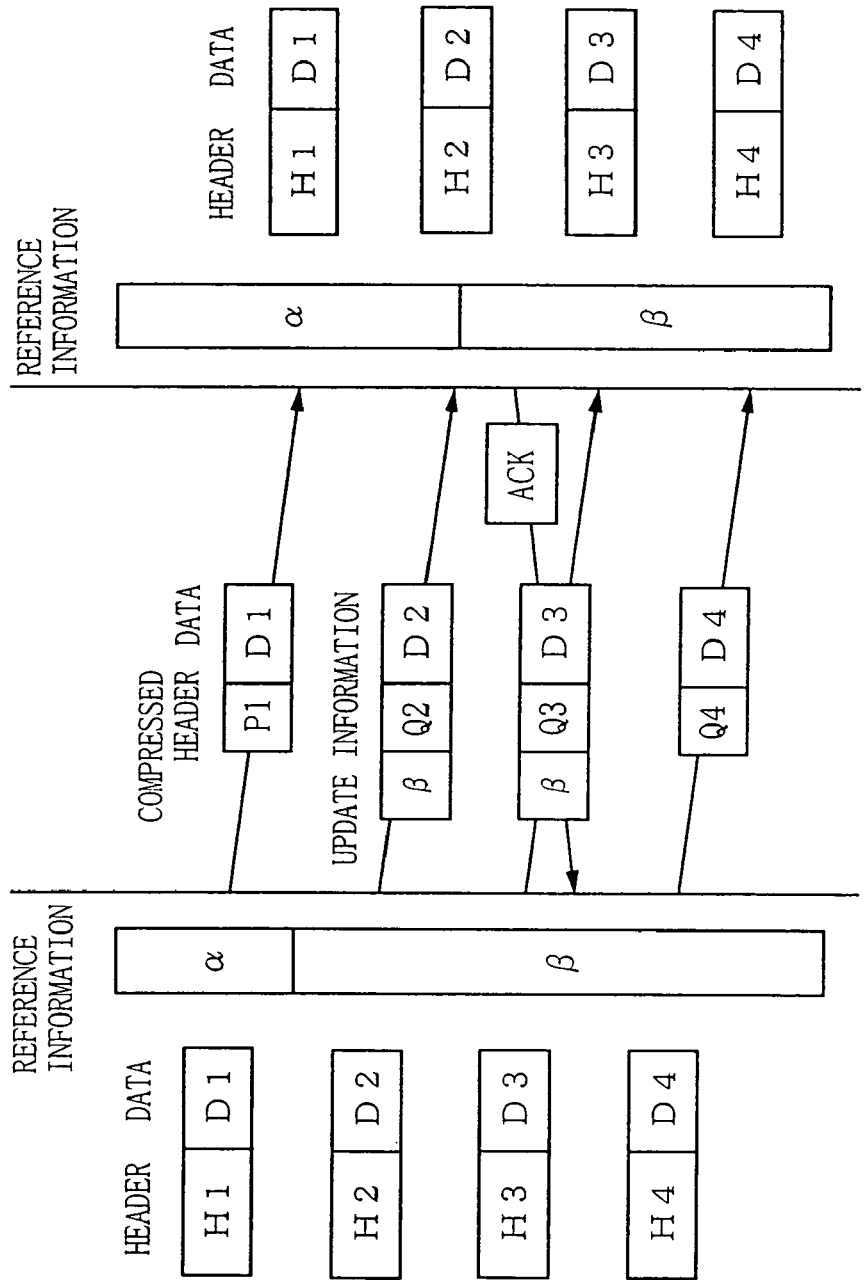
FIG. 9 is a sequence chart of a reliable mode.

FIG. 4 is a block diagram showing a data transmitting apparatus and a data receiving apparatus according to a third embodiment of the present invention. In FIG. 4, a data transmitting apparatus 5 includes a mode determination unit 33 and a delay time measuring unit 43 for measuring a roundtrip delay time, and a data receiving apparatus 6 includes a responding unit 44 for responding to the measurement of the roundtrip delay time. In the third embodiment, the switching of the header compression scheme is determined at the transmitting side based on the roundtrip delay time, which is different from the first embodiment where the switching is determined based on the number of received ACK packets or NACK packets. In the third embodiment, components that are the same as those in the first embodiment are provided with the same reference numerals, and not described herein.

To measure a roundtrip delay time between the data transmitting apparatus 1 and the data receiving apparatus 2, the delay time measuring unit 43 transmits, at predetermined time intervals X, a delay time measuring packet with a timestamp added thereto. The responding unit 44 receives the delay time measuring packet, and then returns it to the delay time measuring unit 43. On receiving the returned delay time measuring packet, the delay time measuring unit 43 calculates the difference between a receiving time and a timestamp added to the packet for finding the roundtrip delay time between the data transmitting apparatus 5 and the data receiving apparatus 2, and outputs the calculation result to the mode determination unit 33. By way of example, the delay time measuring packet may be implemented by the RTCP (Real Time Control Protocol) packet described in RFC 1889. How to measure the delay time is not restricted to the above, and any other method may be taken.

Based on the received roundtrip delay time, the mode determination unit 33 operates as follows. When the data transmitting apparatus 5 and the data receiving apparatus 6 are both in the optimistic mode, if the value of the roundtrip delay time is smaller than the predetermined time Y, the mode determination unit 33 determines that the transmission reliability should be increased since it does not take much time to receive the ACK packet from the data receiving apparatus 6. Therefore, the mode determination unit 33 outputs a mode switching signal 53 for switching to the reliable mode where the occurrence of header decompression error is suppressed and the transmission is reliable more.

On the other hand, when the data transmitting apparatus 5 and the data receiving apparatus 6 are both in the reliable mode, if the value of the roundtrip delay time is larger than the predetermined time Z, the mode determination unit 33 determines that degradation in compression efficiency should be prevented since it takes much time to receive the ACK packet from the data receiving apparatus 6. Therefore, the mode determination unit 33 outputs the mode switching signal 53 for switching to the optimistic mode.

The packet compression unit 12 switches the header compression scheme based on the mode switching signal 53 outputted from the mode determination unit 33. For this switching, as with the first embodiment, the three-step handshake is carried out, for example.

As stated above, according to the present embodiment, based on the roundtrip delay time between the transmitting side and the receiving side, the transmitting side switches the header compression scheme to the reliable mode when the roundtrip delay time is short, and to the optimistic mode when long. As such, by switching the header compression scheme at the transmitting side, the header compression efficiency and the transmission quality can be improved during wireless communication.

Fourth Embodiment

FIG. 5 is a block diagram showing a data transmitting apparatus and a data receiving apparatus according to a fourth embodiment of the present invention. A data transmitting apparatus 7 includes the mode change request receiver 41 and the responding unit 44, and a data receiving apparatus 8 includes a mode determination unit 34, the mode change request transmitter 42, and the delay time measuring unit 43. In the fourth embodiment, the switching of the header compression scheme is determined at the receiving side based on the roundtrip delay time, which is different from the second embodiment where the switching is determined based on the number of received ACK packets or NACK packets. In the fourth embodiment, components that are the same as those in the first to third embodiments are provided with the same reference numerals. The detail of the present embodiment is evident from the above description of the first to third embodiments, and therefore not described herein.

According to the fourth embodiment, based on the roundtrip delay time between the transmitting side and the receiving side, the receiving side switches the header compression scheme to the reliable mode if the delay time is short, and to the optimistic mode if long. As such, by switching the header compression scheme at the receiving side, the header compression efficiency and the transmission quality can be improved during wireless communication.

Here, example modification is mentioned only for the first embodiment. However, similar example modification can be applied also to the second to fourth embodiments. That is, as to the value of the number of header decompression errors in the data receiving apparatus or the value of the roundtrip delay time, the mode determination unit increases the unit time X when the rate of change in the value is smaller than the predetermined value A, and decreases the unit time X when the rate of change is larger than the predetermined value B. In any example modification, highly responsive to the change in transmission quality during wireless transmission, the transmitting or receiving side switches the header compression scheme, thereby improving the compression efficiency and the transmission quality during wireless transmission.

While the invention has been described in detail, the foregoing description is in all aspects illustrative and not restrictive. It is understood that numerous other modifications and variations can be devised without departing from the scope of the invention.

What is claimed is:

1. A header compression apparatus for compressing a header of a packet to be transmitted by referring to reference information that is also included in a receiving side, said header compression apparatus comprising:
   a reference information manager operable to store and manage the reference information;
   a packet compressor operable to compress the header of the packet in a specified operation mode by referring to the reference information, and to selectively add, to the compressed packet, update information for updating the reference information at the receiving side;
   a packet transmitter operable to transmit the packet compressed by said packet compressor;
   a packet receiver operable to receive an ACK packet indicating that the reference information at the receiving side has been correctly updated or a NACK packet for requesting transmission of the update information due to a header decompression error that occurred at the receiving side; and
   a mode switching unit operable to dynamically switch, based on one of a number of ACK packets received and a number of NACK packets received, the operation mode of said packet compressor between a reliable mode where, after the reference information of said header compression apparatus is updated, said packet compressor continuously adds the update information until the ACK packet is received, and an optimistic mode where said packet compressor adds the update information when the reference information of said header compression apparatus is updated and whenever receiving the NACK packet.

2. A header decompression apparatus for decompressing a header of a received packet by referring to reference information that is also included in a transmitting side, said header decompression apparatus comprising:
   a reference information manager operable to store and manage the reference information;
   a packet receiver operable to receive the packet with update information selectively added thereto for updating the reference information;
   a packet decompressor, provided with the packet received by said packet receiver, operable to update the reference information by using the update information, and to decompress the header of the packet by referring to the reference information;
   a packet transmitter operable to transmit an ACK packet indicating that the reference information has been correctly updated or a NACK packet for requesting transmission of the update information when a header decompression error occurs in said packet decompressor;
   a mode switching unit operable to dynamically switch, based on one of a number of ACK packets received and a number of NACK packets received, an operation mode of the transmitting side between a reliable mode where, after updating the reference information of the transmitting side, the transmitting side continuously adds the update information until receiving the ACK packet, and an optimistic mode where the transmitting side adds the update information when the reference information of the transmitting side is updated and whenever receiving the NACK packet; and
   a mode notification unit operable to notify the transmitting side of the operation mode selected by said mode switching unit.

3. A header compression apparatus for compressing a header of a packet to be transmitted by referring to reference information that is also included in a receiving side, said header compression apparatus comprising:
   a reference information manager operable to store and manage the reference information;
   a packet compressor operable to compress the header of the packet in a specified operation mode by referring to the reference information, and to selectively add, to the compressed packet, update information for updating the reference information at the receiving side;
   a packet transmitter operable to transmit the packet compressed by said packet compressor;
   a packet receiver operable to receive an ACK packet indicating that the reference information at the receiving side has been correctly updated or a NACK packet for requesting transmission of the update information due to a header decompression error that occurred at the receiving side;
   a delay time measuring unit operable to measure a roundtrip delay time with respect to the receiving side by transmitting and receiving a packet to and from the receiving side; and
   a mode switching unit operable to dynamically switch, based on the roundtrip delay time, the operation mode of said packet compressor between a reliable mode where, after the reference information of said header compression apparatus is updated, said packet compressor continuously adds the update information until the ACK packet is received, and an optimistic mode where said packet compressor adds the update information when the reference information of said header compression apparatus is updated and whenever receiving the NACK packet.

4. A header decompression apparatus for decompressing a header of a received packet by referring to reference information that is also included in a transmitting side, said header decompression apparatus comprising:
   a reference information manager operable to store and manage the reference information;
   a packet receiver operable to receive the packet with update information selectively added thereto for updating the reference information;
   a packet decompressor, provided with the packet received by said packet receiver, operable to update the reference information by using the update information, and to decompress the header of the packet by referring to the reference information;
   a packet transmitter operable to transmit an ACK packet indicating that the reference information has been correctly updated or a NACK packet for requesting transmission of the update information when a header decompression error occurs in said packet decompressor;

a delay time measuring unit operable to measure a roundtrip delay time with respect to the transmitting side by transmitting and receiving a packet to and from the transmitting side;

a mode switching unit operable to dynamically switch, based on the roundtrip delay time, an operation mode of the transmitting side between a reliable mode where, after updating the reference information of the transmitting side, the transmitting side continuously adds the update information until receiving the ACK packet, and an optimistic mode where the transmitting side adds the update information when the reference information of the transmitting side is updated and whenever receiving the NACK packet; and a mode notification unit operable to notify the transmitting side of the operation mode selected by said mode switching unit.

5. A header compression method of compressing a header of a packet to be transmitted by referring to reference information that is also included in a receiving side, said header compression method comprising:

compressing a packet by compressing the header of the packet in a specified operation mode by referring to the reference information stored, and selectively adding, to the compressed packet, update information for updating the reference information at the receiving side;

transmitting the packet compressed in said compressing;

receiving an ACK packet indicating that the reference information at the receiving side has been correctly updated or a NACK packet for requesting transmission of the update information due to a header decompression error that occurred at the receiving side; and dynamically switching, based on one of a number of ACK packets received and a number of NACK packets received, the operation mode of said compressing between a reliable mode where, after the reference information is updated, the update information is continuously added until the ACK packet is received, and an optimistic mode where the update information is added when the reference information is updated and whenever the NACK packet is received.

6. A header decompression method of decompressing a header of a received packet by referring to reference information that is also included in a transmitting side, said header decompression method comprising:

receiving the packet with update information selectively added thereto for updating the reference information stored;

decompressing the packet received during said receiving, by updating the reference information by using the update information, and decompressing the header of the packet by referring to the reference information;

transmitting an ACK packet indicating that the reference information has been correctly updated or a NACK packet for requesting transmission of the update information when a header decompression error occurs in said decompressing;

dynamically switching, based on one of a number of ACK packets received and a number of NACK packets received, an operation mode of the transmitting side between a reliable mode where, after updating the reference information of the transmitting side, the transmitting side continuously adds the update information until receiving the ACK packet, and an optimistic mode where the transmitting side adds the update information when the reference information of the transmitting side is updated and whenever receiving the NACK packet; and notifying the transmitting side of the operation mode selected in said switching.

7. A header compression method of compressing a header of a packet to be transmitted by referring to reference information that is also included in a receiving side, said header compression method comprising:

compressing a packet by compressing the header of the packet in a specified operation mode by referring to the reference information stored, and selectively adding, to the compressed packet, update information for updating the reference information at the receiving side;

transmitting the packet compressed in said compressing;

receiving an ACK packet indicating that the reference information at the receiving side has been correctly updated or a NACK packet for requesting transmission of the update information due to a header decompression error that occurred at the receiving side;

measuring a roundtrip delay time with respect to the receiving side by transmitting and receiving a packet to and from the receiving side; and dynamically switching, based on the roundtrip delay time, the operation mode of said compressing between a reliable mode where, after the reference information to be referred to is updated, the update information is continuously added until the ACK packet is received, and an optimistic mode where the update information is added when the reference information is updated and whenever the NACK packet is received.

8. A header decompression method of decompressing a header of a received packet by referring to reference information that is also included in a transmitting side, said header decompression method comprising:

receiving the packet with update information selectively added thereto for updating the reference information stored;

decompressing the packet received during said receiving, by updating the reference information by using the update information, and decompressing the header of the packet by referring to the reference information;

transmitting an ACK packet indicating that the reference information has been correctly updated or a NACK packet for requesting transmission of the update information when a header decompression error occurs in said decompressing;

measuring a roundtrip delay time with respect to the transmitting side by transmitting and receiving a packet to and from the transmitting side;

dynamically switching, based on the roundtrip delay time, an operation mode of the transmitting side between a reliable mode where, after updating the reference information of the transmitting side, the transmitting side continuously adds the update information until receiving the ACK packet, ands an optimistic mode where the transmitting side adds the update information when the reference information of the transmitting side is updated and whenever receiving the NACK packet; and notifying the transmitting side of the operation mode selected in said switching.

* * * * *

UNITED STATES PATENT AND TRADEMARK OFFICE
CERTIFICATE OF CORRECTION

PATENT NO.         : 7,644,186 B2                                             Page 1 of 1
APPLICATION NO.    : 11/003981
DATED              : January 5, 2010
INVENTOR(S)        : Koichi Hata et al.

It is certified that error appears in the above-identified patent and that said Letters Patent is hereby corrected as shown below:

In the Claims

In column 22, claim 8, line 57, please replace "ands" with --and--.

Signed and Sealed this

Twenty-second Day of June, 2010

David J. Kappos
*Director of the United States Patent and Trademark Office*